Aug. 2, 1966   C. R. ARMSTRONG   3,264,650
TIME DURATION MEASURING APPARATUS
Filed Feb. 13, 1964   2 Sheets-Sheet 1

INVENTOR.
BY CHARLES R. ARMSTRONG
*George L. Church*
ATTORNEY

INVENTOR.
CHARLES R. ARMSTRONG

United States Patent Office 3,264,650
Patented August 2, 1966

3,264,650
TIME DURATION MEASURING APPARATUS
Charles R. Armstrong, Broomall, Pa., assignor to Sun Oil Company, Philadelphia, Pa., a corporation of New Jersey
Filed Feb. 13, 1964, Ser. No. 344,626
3 Claims. (Cl. 346—36)

This invention relates to apparatus for measuring the time duration of an event which may require an appreciable time (on the order of one or more minutes, for example).

In a petroleum refinery, rather large drum-type filters are used to effect a separation of oil and wax. It is important to know the filter drum speed (expressed in minutes per revolution) of such filters.

An object of this invention is to provide a novel apparatus for measuring the time duration of an event.

Another object is to provide a novel apparatus for continuously monitoring the speed of a shaft, in minutes per revolution.

A further object is to adapt a conventional pneumatic recording controller to the measurement of time duration.

The foregoing and other objects of the invention are accomplished, briefly, in the following manner: A pneumatically-operated proportional controller, mounted integrally on a recorder, is supplied with pressure-regulated air from a suitable source of compressed air. The output of the controller is connected to the input thereof, and both are connected to a vent valve of the on-off "poppet" type. This vent valve is operated by a cam driven by the filter drum shaft which is to be timed, the vent valve being closed by this cam during a small angle of rotation of the filter drum shaft.

Figure 1:
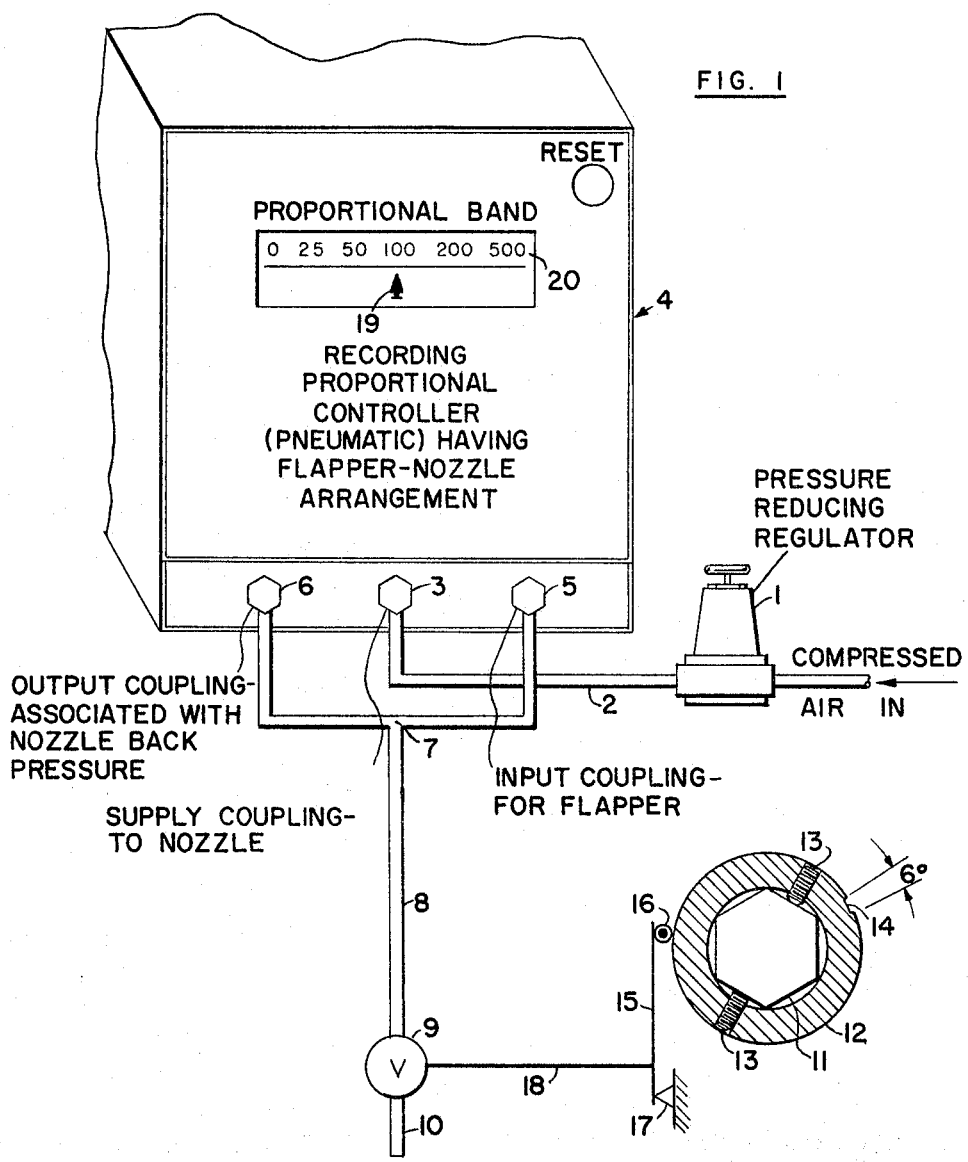
Figure 2:
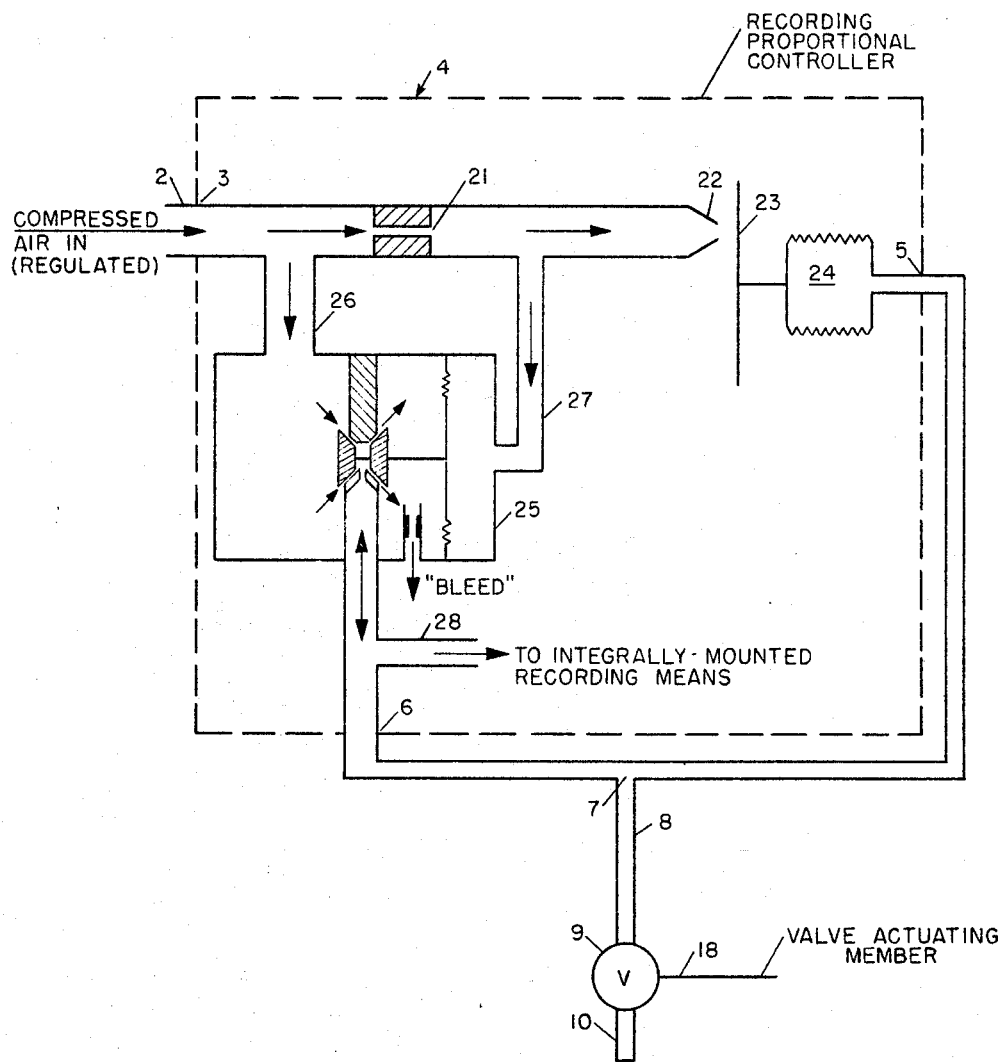

A detailed description of the invention follows, taken in conjunction with the accompanying drawings, wherein:

FIG. 1 is a diagrammatic representation of a time duration measuring apparatus according to the invention; and FIG. 2 is a somewhat schematic drawing illustrating details of the proportional controller of FIG. 1.

Now refer to the drawings. Instrument air (dry compressed air) is supplied through an adjustable pressure reducing regulator 1 to a conduit or pipe 2 which extends to the supply coupling 3 of a pneumatically-operated proportional controller denoted generally by numeral 4. The proportional controller 4 is mounted integrally on a recorder (not shown), having an ordinary movable recording element or pen which cooperates with a driven chart.

The pneumatically-operated controller 4 has a more or less conventional flapper-nozzle (baffle-orifice) arrangement which is schematically illustrated in FIG. 2. The supply coupling 3 is connected by way of a restriction 21 to a nozzle (orifice) 22 with which a flapper (baffle) 23 cooperates. That is to say, the flapper 23 is arranged to move toward and away from the nozzle 22 (which latter is supplied with compressed air via restriction 21). The controller 4 has an input coupling 5 (which may be thought of as a "measurement" connection) which is connected by way of a bellows 24 to the flapper 23 of the flapper-nozzle arrangement 22, 23, so that the pneumatic signal at 5 controls the position of the flapper 23 with respect to the nozzle 22. The controller 4 also has an output coupling 6 which is connected through a control relay 25 (to which latter compressed air is also supplied, via a pipe 26) to the back pressure on the nozzle 22, via a pipe 27. From the output coupling 6, an internal connection is taken off via a conduit 28 to the integrally-mounted recording means previously mentioned.

The output coupling 6 is connected to one arm of a T fitting 7, while the input coupling 5 is connected to another arm of the T 7. From the third arm of T 7, a pipe 8 leads through an on-off valve 9 (for example, of the "poppet" type) to a pipe 10 which is an atmospheric vent. The valve 9 is arranged to be operated by a cam, in a manner which will be described hereinafter.

The rotating shaft of a filter drum, the time duration per revolution of which is to be measured by the apparatus of this invention, is indicated at 11. The filter drum shaft, although generally round, has a portion of hexagonal cross-section as illustrated. A cam ring 12 is rigidly secured to the hexagonal portion of shaft 11, for example by means of a pair of set screws 13 which threadedly engage the ring and bear against the shaft. Cam ring 12 surrounds shaft 11 and has in its periphery a narrow notch 14 which provides the "dwell" of the cam, with the cam "rise" being provided by the remaining circular portion of the ring periphery. The notch 14 is "narrow" in the circumferential direction, as compared to the full 360° circumference of ring 12. This will be further detailed hereinafter. It may be seen, from the foregoing, that the cam ring 12 is driven by the filter drum shaft 11, and rotates therewith.

A cam follower 15, carrying at one end a roller 16 which rides on cam ring 12, is pivoted or fulcrumed at its other end, as indicated at 17, to the fixed or stationary housing of the filter. Secured to cam follower 15 is a valve actuating member 18 which operates the on-off valve 9. Vent valve 9 is open or "on" during the major portion of each revolution of shaft 11, being held open by the cam follower roller 16 riding on the circular portion of the periphery of ring 12. However, when roller 16 drops into notch 14, once during each revolution of ring 12 (that is, when the follower drops into the "dwell" of the cam), valve 9 is closed or turned "off," and this valve remains closed while the follower is in the "dwell" of the cam.

In theory, the controller 4 integrates an error signal for a specified time, to wit, the time during which vent valve 9 is closed. Each incremental amount of the integration is determined by the proportional gain in the controller, as well as by the magnitude of the error signal, which latter depends upon the controller set point. The proportional gain in the controller is set by a proportional band adjusting lever 19 cooperating with a scale 20 on the proportional controller 4. A summation is recorded by the pen of the recorder; this summation is the total result of the integration at the end of an elapsed time. In connection with the foregoing reference to an error signal, the following is pointed out. Error-detecting mechanisms are commonly built into controllers, to compare a measured variable (pen record) to a desired value of the measured variable (set point) in a process, the difference being the error. The "error" of the present apparatus is obtained by arbitrarily setting the set point of the controller at 100% on the instrument scale. In order for the apparatus to operate properly, the set point should remain at the top of the scale. The "reset" of the controller 4 is adjusted to the minimum end of its range of adjustment.

In an actual application of the time duration measuring apparatus of this invention, wherein it was to be used to measure the time required for one revolution of a filter drum, the shortest time to be recorded was one minute, and the longest was 3.5 minutes; these limits were determined from plant records. These times are stated herein merely by way of example.

When the vent valve 9 is open to the atmosphere, the pen of the recorder will remain at rest on zero. This is because, with this valve open, taking into account the length and diameter of the tubing 8 between the controller and the valve, as well as the air pressure supplied by pipe 2 to the controller, the back pressure (effective on the pen of the recorder) is 3 p.s.i.g., which is equivalent to "chart zero" for controllers of this type.

When the valve 9 is closed, the increased back pressure is applied to the flapper (of the flapper-nozzle arrangement) via input coupling 5, moving this flapper and causing a change in the nozzle back pressure which results in an increased output pressure from the control relay; this variance acts to move the pen across the chart of the recorder. The pen will stop moving when valve 9 is opened, since at this time the nozzle back pressure ceases changing. If valve 9 remains open, the recording pen will return to zero, and stay there until the valve is again closed. The rate at which the pen moves up-scale on the chart will depend on the amount of supply air admitted through the regulator 1, and the amount of the gain adjustment on the proportional band, as well as, of course, the location of the controller set point. By way of example, the air supply in line 2 may be set at 9 p.s.i.g., and the gain at 100% P.B. (proportional band), the latter being represented by the illustrated position of lever 19 with respect to scale 20. The controller set point, as previously stated, is set at 100% on the recorder scale.

As previously described, the apparatus will integrate during the time that the vent valve 9 is closed. This valve is closed when the follower 15 is in the dwell 14 of the cam. Therefore, integration will be permitted each time the dwell (notch) 14 passes the follower. Since the action of the controller 4 is too rapid for a problem longer than a few seconds and the rotation of shaft 11 is measured in minutes, a time-scale must be used, to correlate the actual measurement to real time.

Maximum and minimum filter speeds previously set forth suggested that one minute of real time be represented by one second of measurement or integration. One revolution of the shaft corresponds to rotation through an angle of 360°; one minute of time is 60 seconds. Thus, the dwell 14 of the cam 12 was determined to be 6° in angular length, as indicated, since 360° divided by 60 is 6. When the shaft 11 makes one revolution in one minute, the cam follower 15 will "dwell" (in notch 14) for one second, causing the apparatus to integrate for one second.

If an evenly divided chart from zero to 10 is used, and if the settings of supply air and gain previously set forth are used, the recording pen will move from zero to 1 on the chart, and return to zero, each time the shaft revolves (assuming a shaft speed of one minute per revolution, as perviously stated). The actual record produced will be a bar graph, one bar being written for each revolution of the filter drum, and the end of each bar toward the 100% end of the chart indicating the time duration of a respective revolution of the filter drum. If the chart has one hundred divisions, a multiplying factor of 0.1 is applied to the record, so it can be read out in minutes; thus, a direct-reading device is provided, wherein the time per drum revolution is indicated directly.

A check for accuracy can be made by noting the number of bars written during one hour of elapsed time. Sixty minutes, divided by the number of bars written in one hour, will be a number equal to the peak of the bar. Thus, if 30 bars are written in one hour, 60 divided by 30 is 2; and, 30 revolutions in 60 minutes (it being remembered that one bar is written per revolution, due to the action of the cam-operated valve as previously described) means that the shaft takes two minutes per revolution. Under these conditions, if the apparatus is adjusted properly the pen will travel to 20 on the chart (since the chart multiplying factor is 0.1), and return to zero, each time the filter drum revolves.

By way of example, the full usable range of an apparatus (instrument), as actually built according to this invention and successfully tested, was 0.5 to 4.0 minutes, with an accuracy of ±0.05 minute and a reproducibility of 0.025 minute. The accuracy value was determined by using a stop watch, in actual field tests, and then comparing this measured time with the time recorded by the instrument; the reproducibility was observed in recorded information taken from chart records.

The invention claimed is:

1. Apparatus for measuring the time duration of an event, comprising a pneumatically-operated proportional controller having a flapper-nozzle arrangement; a compressed air supply coupling for said nozzle, a pneumatic output coupling associated with the back pressure on said nozzle, a pneumatic input coupling for said flapper, means connecting said supply coupling to a source of compressed air, means connecting said input and output couplings together and through a controllable valve to the atmosphere, and means for closing said valve for a time interval proportional to the time duration to be measured.

2. Apparatus in accordance with claim 1, wherein said time interval is shorter than the time duration to be measured.

3. Apparatus for measuring the time required per revolution of a shaft, comprising a pneumatically-operated proportional controller having a flapper-nozzle arrangement; a compressed air supply coupling for said nozzle, a pneumatic output coupling associated with the back pressure on said nozzle, a pneumatic input coupling for said flapper, means connecting said supply coupling to a source of compressed air, means connecting said input and output couplings together and through a controllable valve to the atmosphere, and means operated from said shaft for closing said valve during the rotation of said shaft through a small angle which is a known fraction of 360°.

References Cited by the Examiner

UNITED STATES PATENTS

| | | | |
|---|---|---|---|
| 2,960,097 | 11/1960 | Scheffler | 137—82 |
| 3,001,538 | 9/1961 | DuBois | 137—82 |
| 3,030,804 | 4/1962 | Riegger | 346—124 X |
| 3,181,165 | 4/1965 | Van Winkle et al. | 346—33 |

LOUIS J. CAPOZI, *Primary Examiner.*

LEO SMILOW, *Examiner.*

J. W. HARTARY, *Assistant Examiner.*